US008780928B2

(12) United States Patent
Natarajan et al.

(10) Patent No.: US 8,780,928 B2
(45) Date of Patent: Jul. 15, 2014

(54) METHOD AND SYSTEM FOR DETERMINATION OF ROUTES IN LEO SATELLITE NETWORKS WITH BANDWIDTH AND PRIORITY AWARENESS AND ADAPTIVE REROUTING

(75) Inventors: Narayanan Natarajan, Marlboro, NJ (US); Anindo Bagchi, Ocean, NJ (US); William E. Stephens, Bel Air, MD (US)

(73) Assignee: Telcordia Technologies, Inc., Piscataway, NJ (US)

( * ) Notice: Subject to any disclaimer, the term of this patent is extended or adjusted under 35 U.S.C. 154(b) by 164 days.

(21) Appl. No.: 13/252,711

(22) Filed: Oct. 4, 2011

(65) Prior Publication Data
US 2012/0263042 A1 Oct. 18, 2012

Related U.S. Application Data

(60) Provisional application No. 61/389,459, filed on Oct. 4, 2010.

(51) Int. Cl.
*H04L 1/22* (2006.01)
(52) U.S. Cl.
USPC .......................................... 370/400; 709/239
(58) Field of Classification Search
USPC .............. 370/310.2, 328–339, 349, 396, 400; 455/422.1; 709/239–243
See application file for complete search history.

(56) References Cited

U.S. PATENT DOCUMENTS

| 5,430,729 | A | * | 7/1995 | Rahnema | 370/409 |
| 5,499,237 | A | * | 3/1996 | Richetta et al. | 370/400 |
| 6,127,967 | A | * | 10/2000 | Ghazvinian et al. | 342/354 |
| RE37,140 | E | * | 4/2001 | Schloemer | 455/12.1 |
| 6,310,893 | B1 | * | 10/2001 | Yuan et al. | 370/474 |
| 6,404,749 | B1 | * | 6/2002 | Falk | 370/325 |
| 6,404,769 | B1 | | 6/2002 | Kapoor | |
| 6,609,002 | B1 | * | 8/2003 | Krishnamurthy et al. | 455/428 |
| 6,975,614 | B2 | | 12/2005 | Kennedy | |
| 7,471,645 | B2 | | 12/2008 | Torres et al. | |
| 7,599,314 | B2 | | 10/2009 | Wittenschlaeger | |
| 2002/0141345 | A1 | * | 10/2002 | Szviatovszki et al. | 370/238 |
| 2008/0099625 | A1 | | 5/2008 | Yocom | |
| 2012/0134261 | A1 | * | 5/2012 | Natarajan et al. | 370/225 |

OTHER PUBLICATIONS

Keller et al., Link Strategy for the Mobile Satellite System Iridium, 1996, IEEE, p. 1220-1224.*
Eylem Ekici, Ian F. Akyildiz, and Michael D. Bender, A Distributed Routing Algorithm for Datagram Traffic in LEO Satellite Networks, IEEE/ACM Transactions on Networking, vol. 9, No. 2, pp. 137-147, Apr. 2001.
Eylem Ekici, Ian F. Akyildiz, and Michael D. Bender, A Multicast Routing Algorithm for LEO Satellite IP Networks, IEEE/ACM Transactions on Networking, vol. 10, No. 2, pp. 183-192, Apr. 2002.

(Continued)

*Primary Examiner* — Hoon J Chung
(74) *Attorney, Agent, or Firm* — Philip J. Feig

(57) ABSTRACT

In Low Earth Orbit (LEO) satellite networks data routes for point to point and point to multipoint communication sessions in LEO satellite networks are determined by considering session bandwidth, priority, and the constantly changing terminal-satellite and satellite-satellite connectivity. Multiple routes are computed for a session to facilitate automatic adaptive rerouting by satellite payloads when they encounter network failures or congestion conditions.

9 Claims, 9 Drawing Sheets

(56) References Cited

OTHER PUBLICATIONS

Vidyashankar V. Gounder, Ravi Prakash and Hosame Abu-Amara. Routing in LEO-Based Satellite Networks. Proceedings of IEEE Emerging Technologies Symposium on Wireless Communications and Systems, Richardson, Apr. 1999.

International Application No. PCT/ US2011/054755-PCT International Search Report dated Jan. 6, 2012.

Eylem Ekici, Ian F. Akyildiz and Michael D. Bender, A Multicast Routing Algorithm for LEO Satellite IP Networks, IEEE/ACM Transactions on Networking, vol. 10, No. 2, pp. 183-192, Apr. 2002.

V. V. Gounder, R. Prakash and H. Abu-Amara, "Routing in LEO-Based Satellite Networks," Proceedings of IEEE Emerging Technologies Symposium on Wireless Communications and Systems, Richardson, pp. 22.1-22.6, Apr. 1999.

* cited by examiner

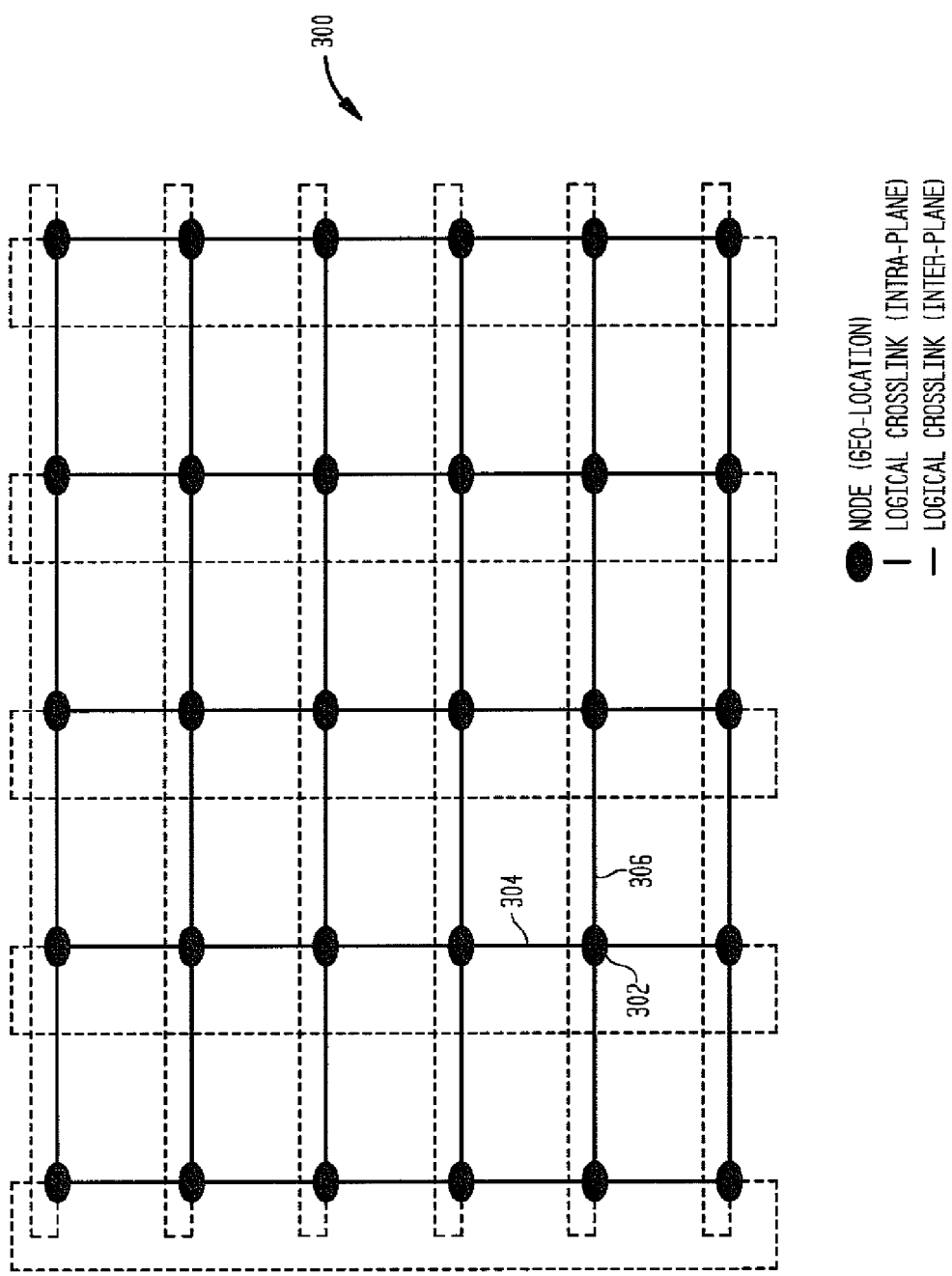

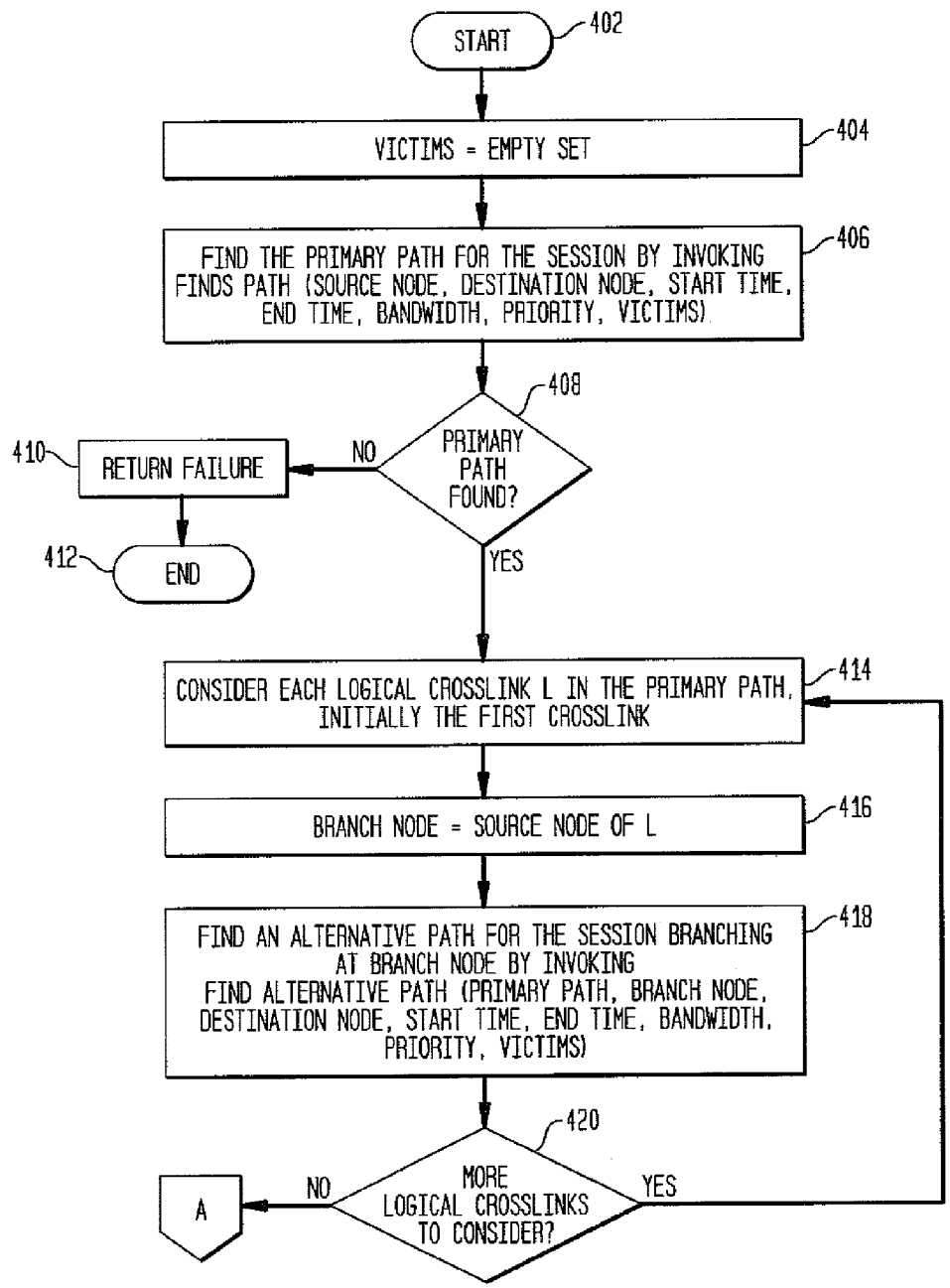

METHOD AND SYSTEM FOR DETERMINATION OF ROUTES IN LEO SATELLITE NETWORKS WITH BANDWIDTH AND PRIORITY AWARENESS AND ADAPTIVE REROUTING

CROSS-REFERENCE TO RELATED APPLICATIONS

This application claims the benefit of U.S. Provisional Application No. 61/389,459, filed on Oct. 4, 2010, which is incorporated by reference herein in its entirety.

This application is related to U.S. patent application Ser. No. 13/149,106 filed May 31, 2011, entitled "Context Aware Adaptive Switching in Reconfigurable Low Earth Orbit Satellite Networks" which is incorporated by reference herein in its entirety.

FIELD OF THE INVENTION

The present invention relates generally to Low Earth Orbit (LEO) satellite networks, and specifically to the determination of routes for point to point and point to multipoint communication sessions in LEO satellite networks considering session bandwidth, priority, and the constantly changing terminal-satellite and satellite-satellite connectivity. Multiple routes are computed for a session to facilitate automatic adaptive rerouting by satellite payloads when they encounter network failures or congestion conditions.

BACKGROUND OF THE INVENTION

Use of Low Earth Orbit (LEO) satellite networks is a promising approach for global data communications (including broadband) in view of their low delay and bit error characteristics compared to Geostationary (GEO) satellites. Further, they do not require high power antennas in ground terminals due to their low distance from the ground. However, due to their orbit, the communication link between a ground terminal and an LEO satellite will be available periodically only for a few minutes. In order to provide continuous communication between ground terminals, the LEO satellites need to be interconnected via inter-satellite links (called crosslinks) and terminal-terminal data traffic will be routed over multiple satellites using these crosslinks. Typically, an LEO satellite network consists of multiple orbit planes, and each plane consists of multiple satellites. The satellite topology (neighbor relationship) within a plane remains invariant while inter-plane topology will change constantly; interplane crosslinks will be dynamically set up and removed. Terminal-satellite associations (uplink and downlink connectivity) will also be changing constantly. Traffic routing in such a dynamically changing network considering the bandwidth and priority requirements of user traffic, network failures, and network congestion is a complex problem.

Several proposals have been made for distributed routing in LEO satellite networks; i.e., each payload router determines routing decisions independently for each packet.

E. Ekici, I. F. Akyildiz, M. D. Bender, A Distributed Routing Algorithm for Datagram Traffic in LEO Satellite Networks, IEEE/ACM Transactions on Networking, VOL. 9, NO. 2, April 2001 propose a distributed routing algorithm for routing datagram traffic in an LEO satellite network. The algorithm generates minimum propagation delay paths. The algorithm is based on the concept that the entire earth is covered by logical locations of satellites. These logical locations do not move and are filled by the nearest satellite. This concept is similar to the grid concept in the present invention. In Ekici et al routing is performed by considering these logical locations as hops. Unlike classical routing algorithms used in terrestrial routers, the algorithm does not require satellites to exchange topology information, but computes routes based on some mathematical properties of minimum delay paths between logical locations taking into account the different distances between neighbor locations in polar region and non-polar regions. Based on the mathematical properties, a routing table is generated at design time that prescribes on which direction (up, down, right, or left) a satellite should route a packet depending on which region the destination is in (polar or non-polar). The table also includes a secondary direction that should be used if the link on the primary direction is congested, i.e., the output queue is longer than some threshold. Thus, the routing algorithm is capable of rerouting packets around congestion and failure points with low degradation in performance. This routing algorithm is intended for pure datagram traffic. It does not consider bandwidth (QoS) and priority of traffic.

Ekici et al., have extended this algorithm to multicast routing in E. Ekici, I. F. Akyildiz, M. D. Bender, A Multicast Routing Algorithm for LEO Satellite IP Networks, IEEE/ACM Transactions on Networking, VOL. 10, NO. 2, April 2002. The multicast extension requires routing information exchange between payloads.

Vijay Kapoor, Directional Routing of Packets in a Satellite Network, U.S. Pat. No. 6,404,769, issued Jun. 11, 2002 proposes a method for routing packets across a satellite constellation that is made up of multiple orbital planes, each plane carrying multiple satellites that are equally spaced in the plane. Satellites in the same orbital plane are connected via north-south crosslinks. Satellites in different orbital planes are connected via east-west crosslinks. When a connection is needed between two satellites that are in different planes, a controller station in the ground determines a route for the connection taking into account the traffic load on various crosslinks. That is, the cost for route optimality is traffic load on the path rather than delay. The route so determined consists of a "band" which denotes a logical region in the constellation that is orthogonal to orbital planes. The controller provides this route information including the band information, the destination plane, and the destination satellite id to the source satellite which includes it in all packets belonging to that connection. Thus, this scheme employs source routing. Satellites forward packets using this route information by forwarding packets on the source plane until the specified band is reached, then on the band towards the destination plane, and finally on the destination plane towards the destination satellite. In this method, the satellites do not have any route adaptation capabilities. All rerouting decisions are made only by the controller on the ground. Another limitation of this scheme is that it does not consider traffic priority and does not support preemption. Also, the "band" based routes are unlikely to be optimal, since they constrain shortest path selection.

V. V. Gounder, R. Prakash, H. Abu-Amara, Routing in LEO-Based Satellite Networks, IEEE Symposium on Wireless Communications and Systems, April 1999 propose a virtual connection-oriented approach based on tag switching to route data in an LEO satellite network. Routing tables are computed by ground stations and uploaded to satellites at predetermined intervals. Routes are computed by ground stations for different network snapshots. Only forwarding tables for a limited set of snapshots are uploaded to LEO satellites. The payload switch does not have any route adaptation capabilities. All rerouting computations and decisions are made only by ground stations. The ground stations generate routes for each snapshot by determining k shortest paths between the source and the destination. Each one of the k paths is used for routing a specific type of traffic; e.g., delay sensitive traffic is routed on the first shortest path and other types of traffic are routed on the remaining k-1 paths. This scheme also does not consider traffic priority and does not support preemption.

SUMMARY OF THE INVENTION

The present invention presents a scheme for the determination of routes between a source ground terminal and one or more destination ground terminals across an LEO satellite network. The scheme is intended to be used by a network operations center on the ground that receives requests from users of the satellite network to establish communication sessions between two or more ground terminals with specific bandwidth, priority, and duration and generates network routes for the requested sessions.

The scheme has the following innovative features:

1. Routes are determined by the operations center considering session bandwidth, priority, and duration requirements.

2. If necessary, lower priority sessions are preempted to accommodate an incoming high priority session. The number of sessions preempted is minimized 3. Routes are generated considering changes in terminal-satellite connectivity and satellite-satellite connectivity that may occur during the session lifetime. Thus, data between two ground terminals may be routed via different paths (crosslinks/uplink/downlink) in the satellite network at different time instants.

4. Multiple routes are computed for a session to facilitate automatic adaptive rerouting by the payloads when they encounter crosslink failures or congestion. Payloads do not require knowledge of the entire network topology or status. A payload needs to know only the failure or congestion status of its crosslinks to perform adaptive rerouting upon crosslink failures or congestion. Based on the determined routes for a session, the operations center on the ground generates data forwarding rules for payloads and uploads them to the payloads. The forwarding rules specify for each payload the crosslink on which a session traffic should be routed under normal conditions, and the crosslink on which the session traffic should be routed in case of congestion or failure.

5. Routes are generated for both point-to-point sessions and point-to-multipoint sessions.

Some of the prior solutions to LEO satellite routing, such as the work of Ekici et al., present distributed routing algorithms that are executed in payloads. The invention described herein presents a centralized routing solution that is executed in a planning node on the ground.

Some other prior solutions to LEO satellite routing, such as the work of Kapoor and Grounder et al., present a centralized routing solution. However, they do not consider session priority and routes are computed without considering preemption of lower priority sessions. Further, they do not support adaptive rerouting by payloads. When network failures or congestions occur, new routes are computed by the planning node on the ground only after the events occur. This results in a slow reaction to network events and causes disruption of communications. Further, neither Kapoor nor Grounder et. al. provides point-to-multipoint routing.

A novel feature of the described invention is the clear separation of route determination from payload forwarding rule generation. Routes are computed based on the Grid concept that represents a logical satellite constellation topology that is invariant over time and available bandwidth on logical crosslinks that varies over time. This concept facilitates route computation without considering satellite orbits. After the routing algorithm has determined the logical paths (primary and alternative paths), payload forwarding rules are generated. Only in this phase, the satellite orbits are considered and forwarding rules are generated considering the satellite geolocations at different time instants during the session lifetime.

The primary uniqueness of the present invention is the LEO Satellite system context considered. The system context is shown in FIG. 1. The payloads being considered are resource limited and do not have the computing and memory resources to implement a routing algorithm. Despite this resource limitation, one of the major design goals is satellite autonomy that enables a payload to rapidly react to network anomalies. The routing scheme described herein addresses the payload resource constraint and the satellite autonomy objectives. Hence, the routing algorithm is centralized and performed on a ground node, but yet generates multiple routes that facilitate payloads to reroute traffic when they encounter a failure or congestion. A payload needs to know only the failure and congestion status of its crosslinks, and does not need to know network-wide global conditions.

The invention will be better understood when the following description is read in conjunction with the accompanying drawings.

BRIEF DESCRIPTION OF THE DRAWINGS

FIG. 3 is a schematic representation of an LEO satellite grid.

FIGS. 4A and 4B are a flowchart for determining the primary path and alternative paths for a session.

DETAILED DESCRIPTION

Figure 1:
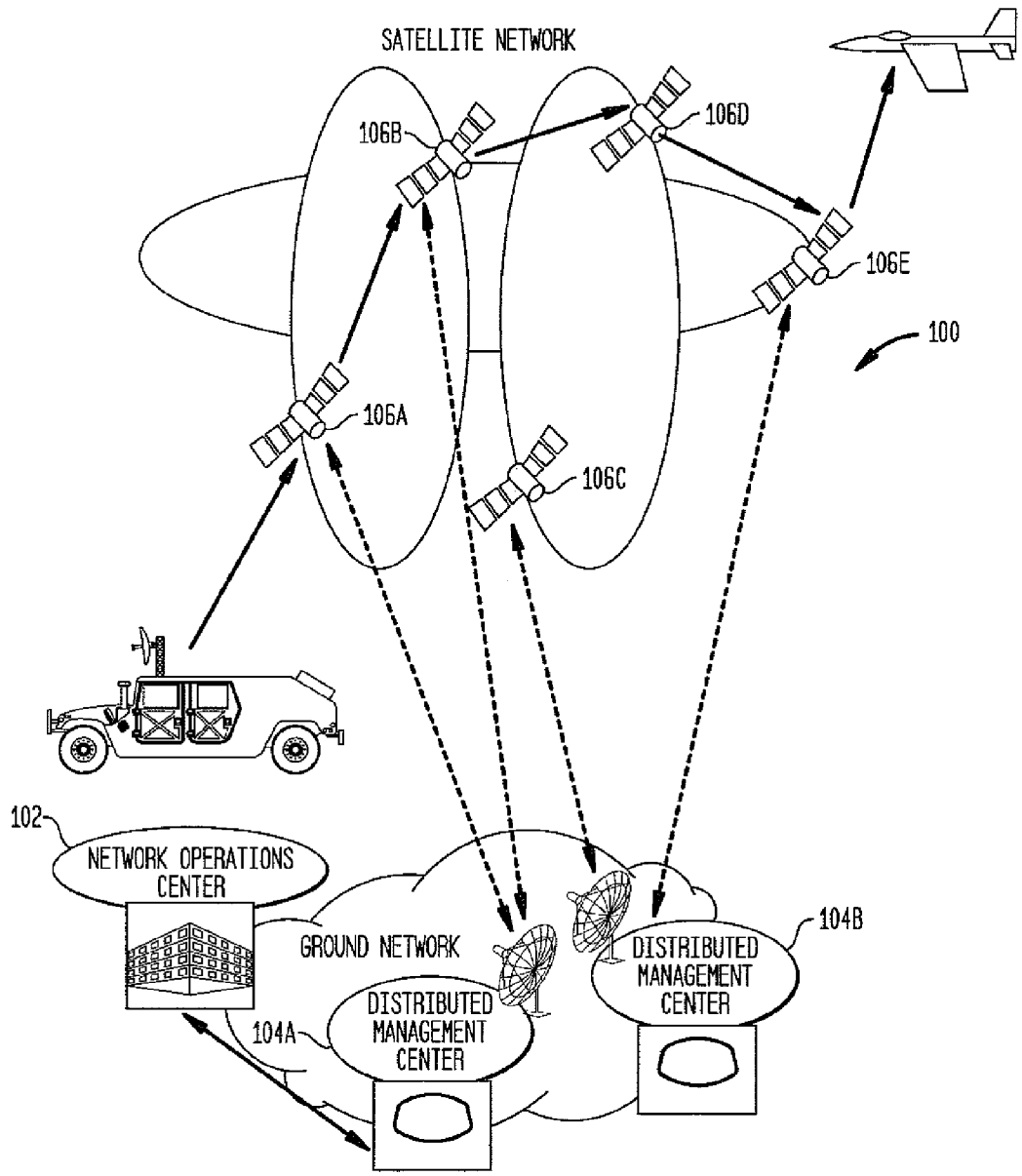
FIG. 1 illustrates a LEO satellite system context.

FIG. 1 illustrates a LEO satellite system context 100 for the route determination scheme described hereinafter. As shown in the figure, the Network Operations Center 102 plans routes for user sessions and disseminates the deter mined routes to Distributed Management Centers 104A, 104 B, etc. The route information is conveyed in the form of forwarding rules for each payload involved in the route. The Distributed Management Centers upload the forwarding rules to the payloads 106A, 106B, 106C, 106D, and 106E within its domain. Payloads forward data packets in accordance with these forwarding rules.

The Network Operations Center includes centralized functions for Network Management. The Network Operations Center plans routes for services, generated payload forwarding rules, disseminates payload forwarding rules to management centers, generates SLA reports, and performs network trouble resolution.

The Distributed Management Center uploads network configuration and policies to payloads and terminals, monitors payload and terminal status and performance, and reports aggregated performance data to the Network Operations Center.

The payload manages resources and forwards packets in accordance with policies, dynamically reroutes packets upon link failure or congestion based on policies, dynamically establishes crosslinks based on policies, and reports status and performance to a designated management center.

The concept and details of forwarding rules have been described in the related patent application Ser. No. 13/149,106 and they are summarized here with some simplifications for easy reference.

A forwarding rule specifies how a data packet received on a crosslink/uplink should be forwarded to another crosslink/downlink.

A forwarding rule is of the form
<Source, Destination, Start Time, End Time, Priority, Output Port 1, Output Port 2, . . . , Output Port n>
where
Source is the Source Address in the packet received;
Destination is the Destination address in the packet received;
Start Time and End Time specify the time interval within which the rule is effective; the time interval may be a recurring interval.
Priority is the priority level assigned to the packet (in the range 0-7, 0 being the lowest and 7 being the highest priority) in accordance with IEEE 802.1pQ Tag standard;
Output Port 1, . . . , Output Port n is an ordered sequence of preferred crosslinks/downlink to which the received packet is to be switched; an Output Port in this sequence is selected if and only if either all previous Output Ports in the sequence have either failed or congested (as determined by a preconfigured threshold)

A forwarding rule specifies the following forwarding behavior. A packet received with source and destination address set to Source and Destination respectively between the time interval Start Time and End Time and that has priority level Priority should be switched to the first found crosslink/downlink, if any, in the specified Output Port sequence, that has neither failed nor congested. If no such crosslink/downlink is found, the packet should be dropped.

Figure 2:
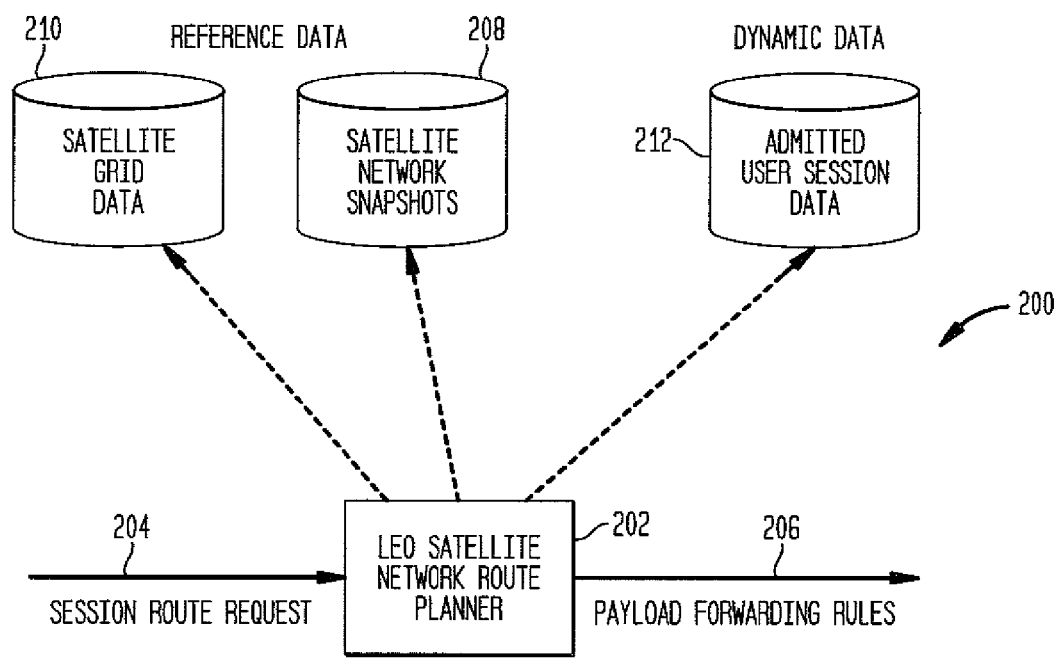
FIG. 2 is a schematic diagram of LEO satellite route planning.

FIG. 2 shows a block schematic diagram 200 for a functional component called the LEO Satellite Network Route Planner 202 that incorporates the route determination scheme. This component takes as input 204 a Session Route Request of the form <Session Id, Source Terminal Address, Source Terminal Location, Addresses and Locations of Destination Terminals, Start Time, End Time, Bandwidth, Priority> where Start Time and End Time together specify the session duration. The Route Planner produces as output 206 the payload forwarding rules for the routes determined for the session. The topology of the satellite network may change during the lifetime of the session due to satellite orbits. Such topology changes are captured using a sequence of snapshots 208, where each snapshot represents the network topology for a specific time interval. If the duration of a session encompasses multiple snapshots, the Route Planner generates forwarding rules for each snapshot. In addition, the Route Planner also computes multiple routes for a session to facilitate adaptive rerouting by the payloads in the following manner. For each session, a primary path and multiple alternative paths are determined. Each alternative path is a path that branches at some payload involved in the primary path, and is to be used by the payload if it encounters a failure or congestion in the crosslink traversed by the primary path egressing from the payload.

The satellite network snapshots are represented using the concept of LEO Satellite Grid (hereafter called the Grid) as shown in FIG. 3. The Grid 300 represents a fixed logical satellite network (constellation) consisting of Nodes 302 connected via vertical edges 304 and horizontal edges 306. A Node represents a geolocation. The geolocations are chosen such that at any time, the LEO satellites at these locations together provide global coverage. A vertical edge represents a Logical Intra-Plane Crosslink, and an horizontal edge represents a Logical Inter-Plane Crosslink. Nodes in the top row and the bottom row are the same and this is denoted by the dotted lines between these nodes. Similarly, nodes in the left most column and right most column are the same and this is also denoted using dotted lines. In addition to the logical topology, the Grid representation also includes delay information for each Logical Inter-Plane and Intra-Plane Crosslink. Delays are minimum near the polar region and maximum in the equator region. This attribute is the cost metric in route computation.

The Satellite Grid Data 210 shown in FIG. 2 has the following information:
 a. Geolocation of each node
 b. Coverage area of each node, i.e., the area in the ground that is covered by a satellite when it occupies the node
 c. Crosslink delay for each Logical Intra-Plane Crosslink and Logical Inter-Plane Crosslink A snapshot is an instance of the grid for a specific time interval and is specified by a set of <Node, Satellite Id> mappings identifying which satellite is occupying which node. This is predetermined based on satellite orbits. From these mappings, the mappings of Logical Crosslinks to Physical Crosslinks (i.e., crosslinks between satellite pairs) in a snapshot are derived. Thus, a snapshot represents the actual satellite network topology for a specific time interval. The satellite network topology changes in a time deterministic and recurring manner. An epoch is the shortest cyclic time interval such that the same sequence of topology changes is repeated in each epoch. All topology changes are entirely captured by the sequence of snapshots within an epoch. Since the sequence of snapshots is the same in each epoch, it is possible to uniquely identify each snapshot by a number in the range 1 to n where n is the number of snapshots in an epoch.

As shown in FIG. 2, the Satellite Grid data 210 and the Satellite Network Snapshot 208 data are reference data for the Route Planner. These are static data and are provided to Route Planner prior to servicing session route requests.

In addition to this reference data, the Route Planner uses another database, called Admitted User Session Data 212 that has dynamic data. This database stores session and route information for each user session that has been admitted into the satellite network. For each session, the following information is stored: Session Id, Start Time, End Time, Bandwidth, Priority, Primary Route, and Alternative Routes. A route is represented as a sequence of logical crosslinks (intra-plane or inter-plane) traversed by the route. This database is updated by the Route Planner when it completes route determination for a session.

Using information in these databases, the Route Planner determines routes for a session in the following manner. The basic concept is that the Route Planner determines routes based on the network topology and delay information in the Grid Data and available bandwidth on each crosslink for the duration of the requested session that is derived from data stored in Admitted User Session Data 212. After the routes are determined for a session, the Planner 202 generates payload forwarding rules 206 for the routes based on Satellite Network Snapshots data 210.

First is a description of the scheme for point-to-point routing, i.e., finding routes for a session with one source terminal and one destination terminal. Extensions for routing with one source and multiple destinations (point-to-multipoint routing) are described later.

The routing problem for determining paths between two terminals is reduced to the problem of finding paths between two nodes in a grid as follows. The source node is determined based on Source Terminal Location and the coverage area of each node. A node whose coverage area contains the Source Terminal Location is selected as the source node. In case of multiple candidate nodes, one node is chosen based some predetermined criteria. The destination node is determined in a similar manner.

Figure 4B:
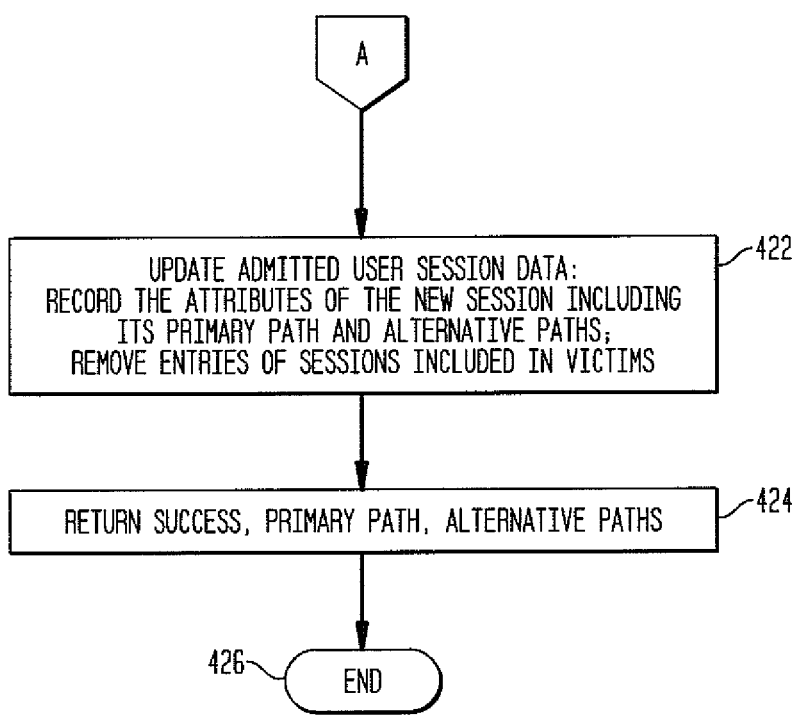
Figure 5A:
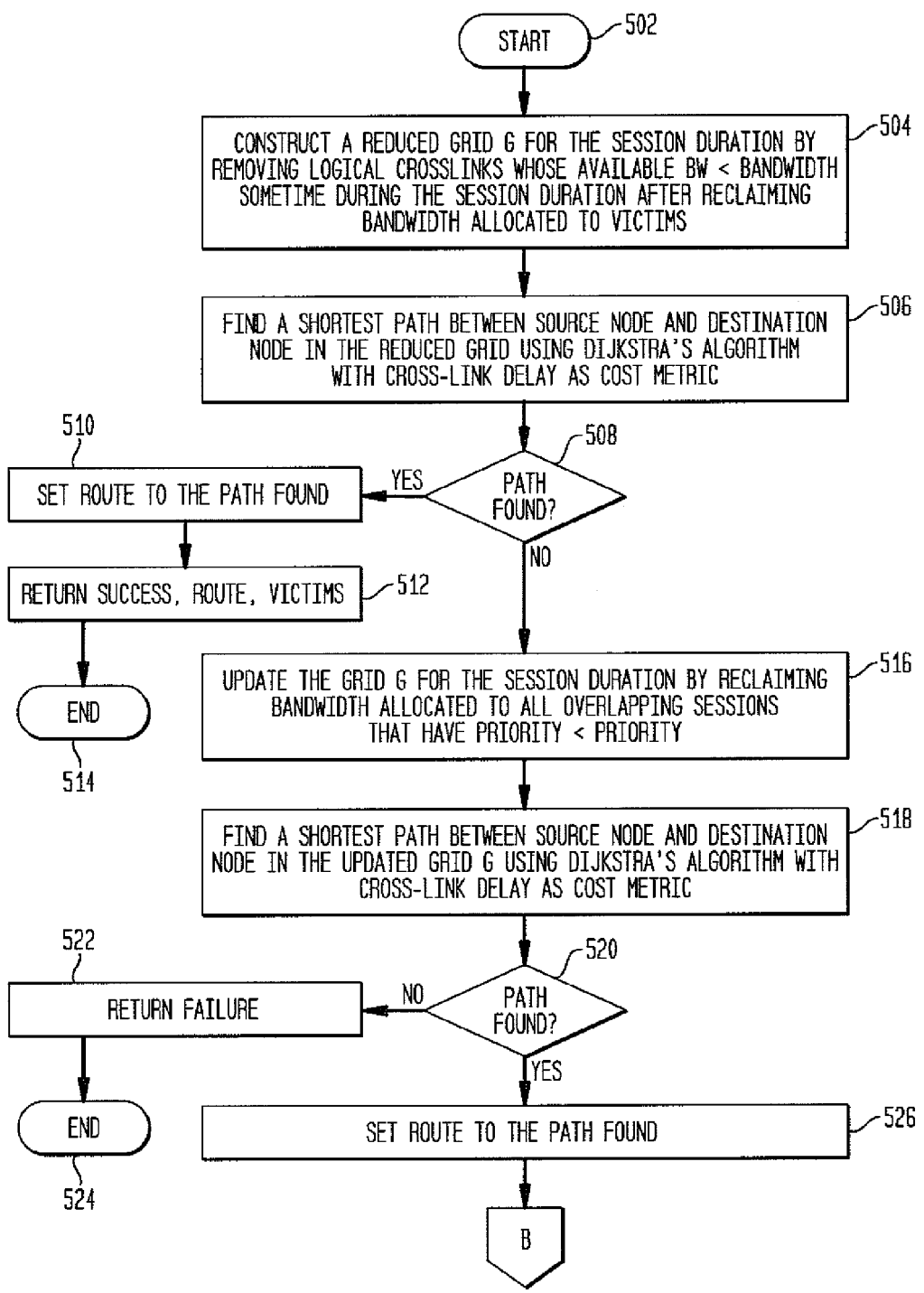
FIGS. 5A and 5B are a flowchart for determining a path between two nodes for a session.
Figure 5B:
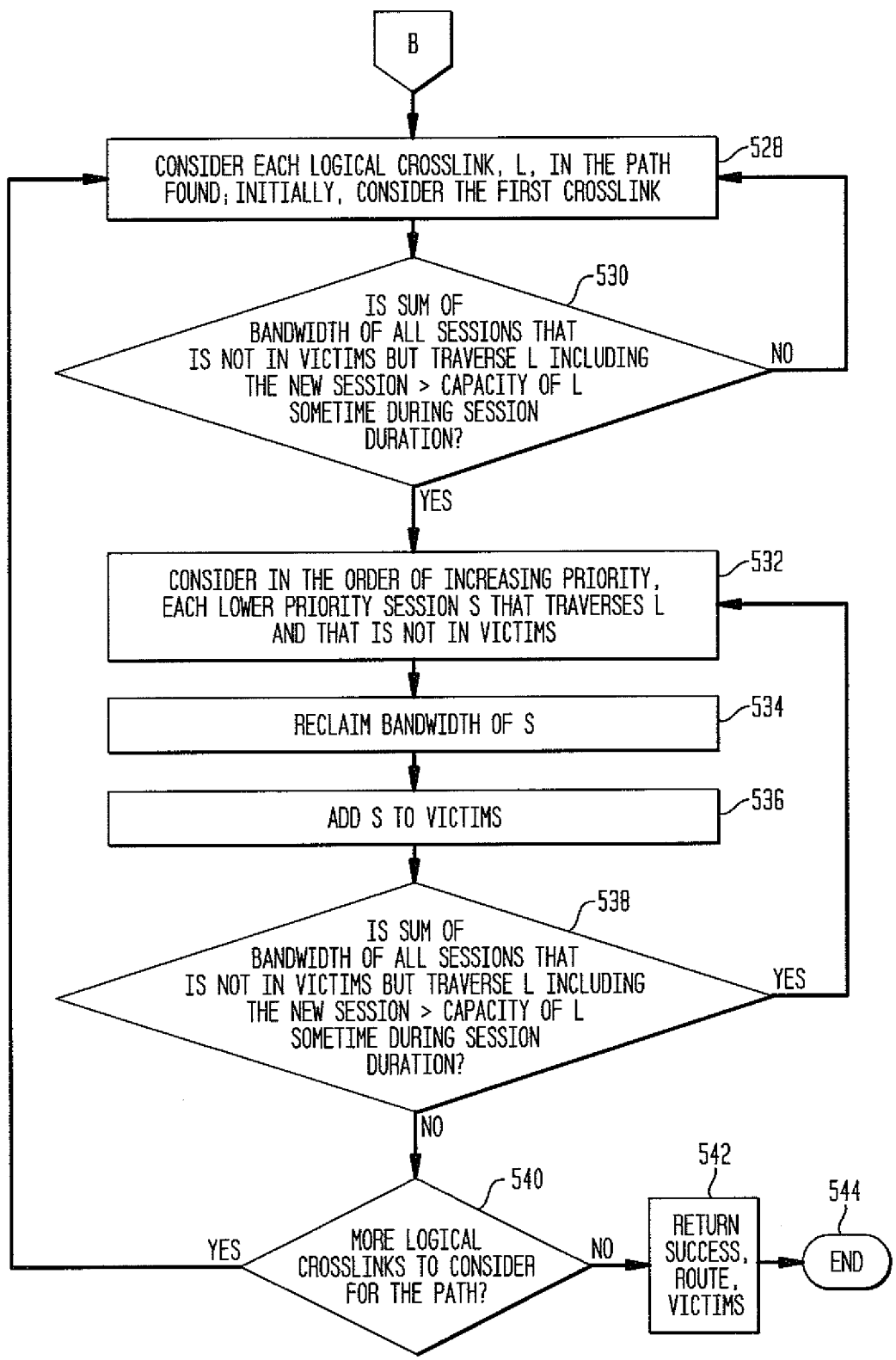
Figure 6:
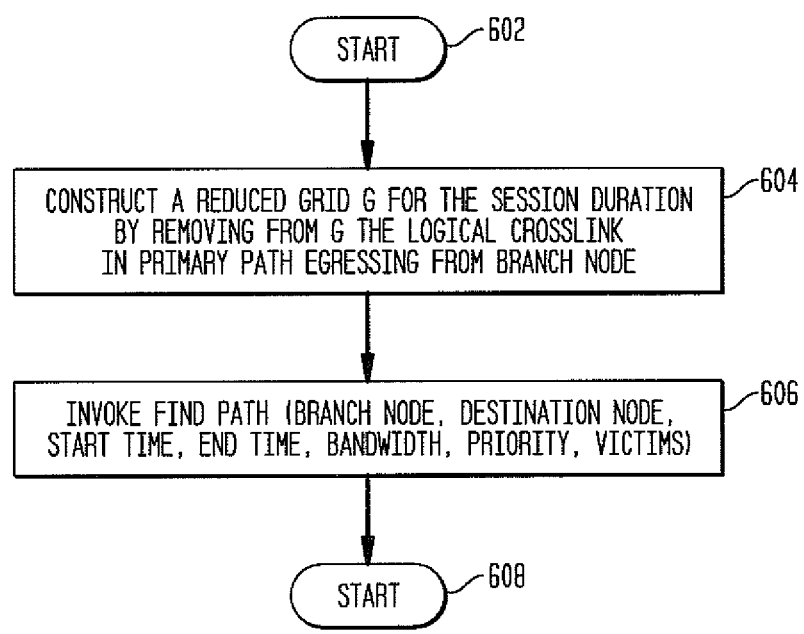
FIG. 6 is a flowchart for determining an alternative path between two nodes for a session.
Figure 7:
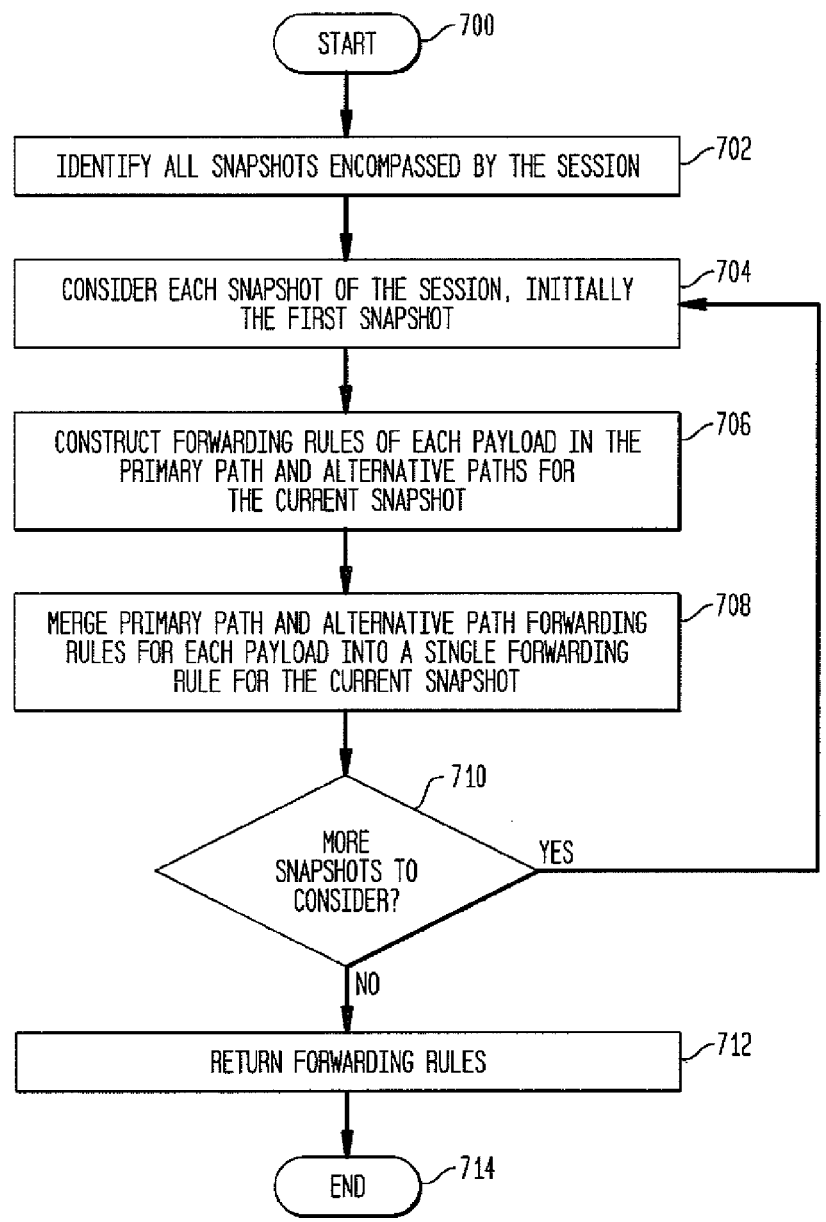
FIG. 7 is a flowchart for the generation of payload forwarding rules for a session.

The algorithm for finding a Primary Path and Alternative Paths for a point to point session is described in the flowcharts shown in FIG. 4A and FIG. 4B. This algorithm uses two other algorithms: one for finding a path between two nodes for a session which is shown in FIG. 5A and FIG. 5B; and another for finding an alternative path between two nodes for a session given the primary path which is shown in FIG. 6. FIG. 7 illustrates the flow chart for the generation of forwarding rules for a session.

The process for determining the primary path and alternative paths for a sessions starts 402 and Victims is set to an empty set 404, where Victims represents the set of sessions that are preempted to accommodate the requested session.

Find the primary path for the session by invoking Find Path (Source Node, Destination Node, Start Time, End Time, Bandwidth, Priority, Victims) 406.

A determination is made whether a primary path is found 408. If a primary path is not found, the system returns a failure 410 and the process ends 412.

If a primary path is found, consider each logical crosslink L in the primary path, initially the first crosslink 414. The Branch Node is made source node of L in step 416. Next Find an alternative path for the session branching at Branch Node by invoking Find Alternative Path (Primary Path, Branch Path, Destination Node, Start Time, End Time, Bandwidth, Priority, Victims) 418.

Determine if there are more logical crosslinks to consider 420. If yes, return to step 414. If no, Update Admitted User Session Data: Record the attributes of the new session including its Primary Path and Alternative Paths; Remove entries of the sessions included in Victims 422. Return Success, Primary Path and Alternative Path 424 and then end the process 426.

The process for determining a path between two nodes for a session is shown in FIGS. 5A and 5B. The process starts 502 and construct a reduced grid G for the session duration by removing logical crosslinks whose Available BW<Bandwidth sometime during the session duration after reclaiming bandwidth allocated to Victims 504. Find a shortest path between Source Node and Destination Node in the reduced grid using Dijkstra's algorithm and cross-link delay as cost metric 506. Determine if a path found 508. If yes, set Route to the path found 510 and Return Success, Route, Victims 512.

If no, update the grid G for the session duration by reclaiming bandwidth allocated to all overlapping sessions that have priority<Priority 516. Find a shortest path between Source Node and Destination Node in the updated grid G using Dijkstra's algorithm with cross-link delay as cost metric 518.

If no path is found 520 return failure 522 and end process 524. If a path is found 520 set Route to the path found 526. Consider each logical crosslink L in the path found; initially consider the first crosslink 528.

Is Sum of bandwidth of all sessions that is not in Victims but traverse L including the new session>Capacity of L sometime during session duration? 530. If no, return to step 528. If yes, consider in the order of increasing priority, each lower priority session S that traverse L and that is not in Victim 532. Reclaim the bandwidth of S, 534. Add S to Victims 536. Is Sum of bandwidth of all sessions that is not in Victims but traverse L including new session>Capacity of L sometime during session duration? 538. If yes, return to step 532. If no, Are there more logical crosslinks to consider for the path? 540. If yes return to step 528. If no, Return Success, Route, Victims 542 and end the process 544.

FIG. 6 is a flowchart for determining an alternative path between two nodes for a session. The process starts 602 and constructs a reduced grid G for the session duration by removing from G the logical crosslink in Primary Path egressing from Branch Node 604. Next, invoke Find Path (Branch Node, Destination Node, Start Time, EndTime, Bandwidth, Priority, Victims) 606. End the process 608.

The process for generating of forwarding rules for a session is shown in FIG. 7. Start the process 700 by identifying all snapshots encompassed by the session 702. Consider each snapshot of the session, initially the first snapshot 704.

The details of the step "Construct forwarding rules for each payload in the primary path and alternative paths for the current snapshot" 706 in FIG. 7 are as follows:

For each edge from a node n1 to a node n2 in the path, the forwarding rule in constructed as follows:

Let A be the satellite occupying n1 ($302_1$) in the snapshot;
Let B be the satellite occupying n2 ($302_2$) in the snapshot;
Let P be the output port in A for the crosslink connected to B;
Let is be either the start time of the session or the start time of the snapshot whichever is later;
Let te be either the end time of the session or the end time of the snapshot whichever is earlier;
Then, the forwarding rule for the satellite A is <Source Terminal Address, Destination Terminal Address, ts, te, p, P> where p is the session priority.

The details of the step "Merge primary path and alternative path forwarding rules for each payload into a single forwarding rule for the current snapshot" 708 in FIG. 7 are as follows:

Let <Source Terminal Address, Destination Terminal Address, ts, te, p, P1> be the forwarding rule for a satellite A in the primary path in a snapshot.

Let <Source Terminal Address, Destination Terminal Address, ts, te, p, P2> be the forwarding rule for an alternative path branching at satellite A in the same snapshot.

Then, the merged forwarding rule for satellite A in the same snapshot is <Source Terminal Address, Destination Terminal Address, ts, te, p, P1, P2>.

Then determine if there are more snapshots to be considered 710. Is yes, then consider the next snapshot 704 and follow the steps above. If no, return forwarding rules 712 and then end the process 714.

Point-to-Multipoint Routing

The point-to-point routing algorithm described above is extended for multipoint routing in the following manner:

The point-to-point routing algorithm is repeatedly invoked by considering each destination in turn. The order in which the destinations are considered is unimportant.

At the end of the initial iteration, the multipoint tree is the path determined for the first destination.

At the end of each subsequent iteration, the path determined for the current destination (called current path) is merged with the multipoint tree which is the cumulative result of previous iterations. This merge is accomplished by scanning the nodes on the current path starting from the current destination until a node n is found such that n is on the current path as well as in the multipoint tree. In the worst case, the source node may be n. Then, the subpath starting from n in the current path is attached as a subtree of n in the multipoint tree.

To avoid double counting of bandwidth allocated on common edges (logical crosslinks) in the paths for different destinations in the multipoint tree, the link bandwidth allocated to the multipoint session is not considered while computing paths (FIGS. 5A and 5B). That is, the Available Bandwidth information for logical crosslinks is computed without considering the bandwidth allocated on the links for the multipoint session.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While there has been described and illustrated a method and system for determination of routes for point to point and point to multipoint communication sessions in LEO satellite networks, it will be apparent to those skilled in the art that variations and modifications are possible without deviating from the broad principles and teachings of the present invention which shall be limited solely by the scope of the claims appended hereto.

What is claimed is:

1. A method of determining a primary path and multiple alternative paths for a point-to-point communication session between two ground terminals connected across by a Low Earth Orbit (LEO) satellite network comprising:
    a computer located at a network operations center for:
    determining routes using the following information:
        changes in terminal—satellite connectivity due to satellite orbits;
        changes in satellite—satellite connectivity due to satellite orbits;
        locations of Source and Destination terminals;
        communication session duration;
        session traffic bandwidth; and
        session traffic priority;
    determining routes for the primary path and alternative paths based on a LEO Satellite Grid where the Grid represents a fixed logical satellite constellation topology comprising logical nodes representing geolocations, vertical edges representing logical intra-plane crosslinks, horizontal edges representing logical inter-plane crosslinks, and delay information on crosslinks;
    wherein the routes for the primary path and alternative paths are determined by computing shortest paths from a Source Node whose coverage area includes a Source terminal location to a Destination Node whose coverage area includes a Destination terminal location, taking into account available bandwidth on logical crosslinks for the duration of the communication session;
    wherein a shortest path is a path that has the minimum delay across the Grid;
    wherein the primary path is determined first without any preemption by constructing a reduced Grid by eliminating all crosslinks that do not have enough available bandwidth for some time during the session duration, and then invoking Dijkstra's algorithm to find a shortest path;
    wherein a path is found by preempting lower priority sessions to accommodate the requested session if a path could not be found without preemption;

wherein the route determination with preemption comprises:
checking if preemption is of help by determining if a route exists if bandwidth allocated to all lower priority sessions is reclaimed:
considering in turn each crosslink traversed by the route and checking if preemption is required on that crosslink to accommodate the session: and
considering each lower priority session traversing such above said crosslink in order of increasing priority, and reclaiming the bandwidth allocated to the lower priority session until enough bandwidth is accumulated to accommodate the high priority session;
wherein multiple alternative paths are generated for the primary path by:
considering in turn each node traversed by the primary path;
removing the crosslink that does not have enough bandwidth in the primary path egressing from a Branch Node; and
determining a shortest path to the Destination Node starting from the Branch Node taking into account bandwidth reclaimed from all lower priority sessions that have been preempted thus far and preempting additional lower priority sessions as needed;
wherein the point-to-point route determination is extended for point-to-multipoint routing by:
considering each destination node in some order, and computing a path to the Destination Node avoiding double counting of bandwidth allocated on common crosslinks in the paths for different destinations;
at the end of the initial iteration, the multipoint tree is the path determined for the first destination; and
merging the current path determined at each iteration with the multipoint tree which is the cumulative result of previous iterations by scanning the nodes on the current path starting from the current destination until a node N is found such that N is on the current path as well as in the multipoint tree; and attaching the subpath starting from N in the current path as a subtree of N in the multipoint tree.

2. The method of claim 1 wherein the geolocations of nodes are chosen such that at any time, the LEO satellites at these locations together provide global coverage.

3. The method of claim 1 wherein forwarding rules are generated for each payload for the routes determined for the primary path and alternative paths for a session by considering each snapshot spanned by the session, where a snapshot is an instance of the Grid for a specific time interval as predetermined by satellite orbits, and consists of a set of <Node, Satellite Id>mappings identifying which satellite is occupying which Node.

4. The method of claim 3 wherein the forwarding rule generation for a snapshot for an edge from a node N1 to a node N2 in a primary path or alternative path comprises:
identifying the satellite A that occupies N1 in the snapshot;
identifying the satellite B that occupies N2 in the snapshot;
identifying the output port P in A for the crosslink connected to B in the snapshot;
identifying the time TS as being the later of either the start time of the session or the start time of the snapshot;
identifying the end time TE as being the earlier of the end time of the session or the end time of the snapshot; and
generating the forwarding rule for satellite A as <Source terminal address, Destination terminal address, TS, TE, p, P>, where p is the session priority.

5. The method of claim 4 wherein forwarding rules generated for the primary path and the alternative path branching at a payload for a snapshot are combined into a single forwarding rule by taking the output port element of each rule and constructing a single output sequence {P0, P1} where P0 is the Port element in the forwarding rule for the primary path and P1 is the Port element in the forwarding rule for the alternative path.

6. A non-transitory computer readable medium having computer readable program for operating on a computer for determining a primary path and multiple alternative paths for a point-to-point communication session between two ground terminals connected across by a Low Earth Orbit (LEO) satellite network, said program comprising instructions that cause the computer to perform the steps of:
determining routes using the following information:
changes in terminal —satellite connectivity due to satellite orbits;
changes in satellite —satellite connectivity due to satellite orbits;
locations of Source and Destination terminals;
communication session duration;
session traffic bandwidth; and
session traffic priority;
determining routes for the primary path and alternative paths based on a LEO Satellite Grid where the Grid represents a fixed logical satellite constellation topology comprising logical nodes representing geolocations, vertical edges representing logical intra-plane crosslinks, horizontal edges representing logical inter-plane crosslinks, and delay information on crosslinks;
wherein the routes for the primary path and alternative paths are determined by computing shortest paths from a Source Node whose coverage area includes a Source terminal location to a Destination Node whose coverage area includes a Destination terminal location, taking into account available bandwidth on logical crosslinks for the duration of the communication session;
wherein a shortest path is a path that has the minimum delay across the Grid;
wherein the primary path is determined first without any preemption by constructing a reduced Grid by eliminating all crosslinks that do not have enough available bandwidth for some time during the session duration, and then invoking Dijkstra's algorithm to find a shortest path;
wherein a path is found by preempting lower priority sessions to accommodate the requested session if a path could not be found without preemption;
wherein the route determination with preemption comprises:
checking if preemption is of help by determining if a route exists if bandwidth allocated to all lower priority sessions is reclaimed;
considering in turn each crosslink traversed by the route and checking if preemption is required on that crosslink to accommodate the session; and
considering each lower priority session traversing such above said crosslink in order of increasing priority, and reclaiming the bandwidth allocated to the lower priority session until enough bandwidth is accumulated to accommodate the high priority session;
wherein multiple alternative paths are generated for the primary path by:
considering in turn each node traversed by the primary path;

removing the crosslink that does not have enough bandwidth in the primary path egressing from a Branch Node; and determining a shortest path to the Destination Node starting from the Branch Node taking into account bandwidth reclaimed from all lower priority sessions that have been preempted thus far and preempting additional lower priority sessions as needed;

wherein the point-to-point route determination is extended for point-to-multipoint routing by:

considering each destination node in some order, and computing a path to the Destination Node avoiding double counting of bandwidth allocated on common crosslinks in the paths for different destinations;

at the end of the initial iteration, the multipoint tree is the path determined for the first destination; and merging the current path determined at each iteration with the multipoint tree which is the cumulative result of previous iterations by scanning the nodes on the current path starting from the current destination until a node N is found such that N is on the current path as well as in the multipoint tree; and attaching the subpath starting from N in the current path as a subtree of N in the multipoint tree.

7. The program of claim 6, wherein forwarding rules are generated for each payload for the routes determined for the primary path and alternative paths for a session by considering each snapshot spanned by the session, where a snapshot is an instance of the Grid for a specific time interval as predetermined by satellite orbits, and consists of a set of <Node, Satellite Id>mappings identifying which satellite is occupying which Node.

8. The program of claim 7, wherein the forwarding rule generation for a snapshot for an edge from a node N1 to a node N2 in a primary path or alternative path comprises:

identifying the satellite A that occupies N1 in the snapshot;

identifying the satellite B that occupies N2 in the snapshot;

identifying the output port P in A for the crosslink connected to B in the snapshot;

identifying the time TS as being the later of either the start time of the session or the start time of the snapshot;

identifying the end time TE as being the earlier of the end time of the session or the end time of the snapshot; and generating the forwarding rule for satellite A as <Source terminal address, Destination terminal address, TS, TE, p, P>, where p is the session priority.

9. The program of claim 8 wherein forwarding rules generated for the primary path and the alternative path branching at a payload for a snapshot are combined into a single forwarding rule by taking the output port element of each rule and constructing a single output sequence {P0, P1} where P0 is the Port element in the forwarding rule for the primary path and P1 is the Port element in the forwarding rule for the alternative path.

* * * * *

UNITED STATES PATENT AND TRADEMARK OFFICE
CERTIFICATE OF CORRECTION

PATENT NO. : 8,780,928 B2  
APPLICATION NO. : 13/252711  
DATED : July 15, 2014  
INVENTOR(S) : Natarajan et al.

Page 1 of 1

It is certified that error appears in the above-identified patent and that said Letters Patent is hereby corrected as shown below:

In the Specification

In Column 3, Line 25, delete "minimized" and insert -- minimized. --, therefor.

In Column 3, Line 61, delete "et. al." and insert -- et al. --, therefor.

In Column 4, Line 49, delete "deter mined" and insert -- determined --, therefor.

In Column 5, Line 31, delete "threshold)" and insert -- threshold). --, therefor.

In Column 6, Line 6, delete "an horizontal" and insert -- a horizontal --, therefor.

In Column 6, Line 24, delete "Crosslink" and insert -- Crosslink. --, therefor.

In Column 6, Line 65, delete "data 210." and insert -- data 208. --, therefor.

In Column 7, Line 23, delete "sessions starts" and insert -- session starts --, therefor.

In Column 8, Line 31, delete "Let is be" and insert -- Let ts be --, therefor.

In the Claims

In Column 11, Line 5, in Claim 1, delete "reclaimed:" and insert -- reclaimed; --, therefor.

In Column 11, Line 8, in Claim 1, delete "session: and" and insert -- session; and --, therefor.

Signed and Sealed this  
Twenty-first Day of October, 2014

Michelle K. Lee  
*Deputy Director of the United States Patent and Trademark Office*